United States Patent Office 2,788,406
Patented Apr. 9, 1957

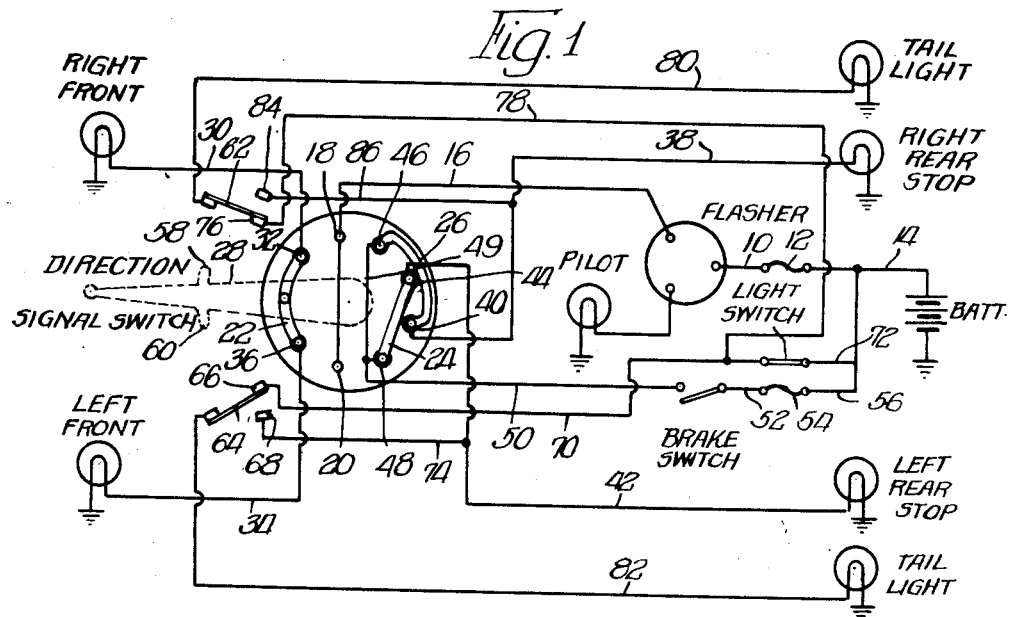

2,788,406
ELECTRICAL SIGNALING SYSTEM FOR VEHICLES

James R. Cavanaugh, Chicago, Ill., assignor to Mildred M. Cavanaugh, Chicago, Ill., as trustee Application November 20, 1952, Serial No. 321,701

3 Claims. (Cl. 200—61.27)

This invention relates to a direction signal circuit, and more particularly to such a circuit designed for use on automotive vehicles, and the like.

In the conventional form of direction signal circuit in use today, signal lights are normally provided at the front of the vehicle, one on each side thereof. In the rear of the vehicle, however, use is made of the normally brake operated stop light disposed on each side of the car, which stop light is generally disposed in close association with the conventional tail light. In daylight operation, the tail lights, of course, normally are not illuminated and therefore the intermittent flashing of the stop light, when used as a turn signal, is readily visible. Since most vehicles have the stop lights in close association with the tail lights, under night driving conditions when the tail lights are also burning, the flashing of the stop lights as signal lights is not so readily visible because of the lack of contrast. If the tail lights are turned off during the flashing of the signal light, the visibility thereof is greatly increased because of the greater contrast. Although de-energizing the conventional tail lights, when the direction signals are actuated, does make the latter more visible, it also has the undesirable feature of reducing the amount of overall warning illumination. It likewise introduces the risk that the tail lights may be inadvertently cut off, even when the signal lights are not activated, so that no lights whatsoever will be in operation at the rear vehicle.

It is therefore an object of this invention to provide an improved direction signal circuit which, rather than deenergizing the tail lights when the rear direction signal lights are activated, will cause the tail light associated with the activated signal light to be simultaneously activated in the same manner as the signal light. In other words, a steadily burning tail light is instantly transferred when the signal light associated therewith is energized to the circuit of the latter light so that the tail light becomes an integral part of the turn signal circuit and both the tail light and the signal light are simultaneously activated by intermittent impulses from the flasher.

Still another object is therefore to increase the intensity of the signal produced and at the same time insure that greater contrast is achieved than would be the case if the tail light continued to burn during the flashing of the signal light.

Further objects and advantages of this invention will become evident as the description proceeds and from an examination of the accompanying drawing which illustrates one embodiment of the invention and in which similar numerals refer to similar parts throughout the several views.

In the drawing:

Figure 1 is a somewhat diagrammatic view showing one form of a direction signal system incorporating the invention;

Figure 2 is a somewhat diagrammatic view showing the direction signal switch and its associated parts in position to indicate a left turn of the vehicle.

In the direction signal system illustrated in the drawing, incandescent lamps are indicated as being disposed at the four corners of the vehicle, the right front and the left front signal lamps being mounted in the conventional fashion on the front fenders of the car, preferably in spaced relation to the head lamps in order to give better contrast. At each of the two rear corners of the vehicle, both a conventional tail light and a stop light are mounted, the former being adapted to be energized, under normal conditions, when the light switch on the dashboard is moved to the "on" position. The two stop lights at the rear of the vehicle under normal conditions are normally activated by the conventional stop light switch operated by the brake pedal so as to give a warning signal when the brake is applied.

The circuit also includes a flasher which may have a conventional form. The flasher is provided with a pilot light which gives an indication of the operativeness or inoperativeness of the direction signal system when it is in operation.

One side of the flasher is connected by the wire 10 to the fuse 12 which is, in turn, connected by the wire 14 to a source of electrical energy, such as the battery shown in both Figures 1 and 2. The other side of the battery is connected to ground in the conventional fashion. The other side of the flasher is connected through the wire 16 to the two contacts 18 and 20 on the direction signal switch, which is preferably of the rotatable form. The switch is provided with the insulated conducting segments or contact bars 22, 24 and 26, which may be shifted in either a clockwise or counterclockwise direction by appropriate movement of the handle 28. Such movement of these segments will bring them into association with certain of the contacts in the direction signal switch, as will be subsequently described.

The right front signal light is connected by the wire 30 to the contact 32 while the left front signal light is connected by the wire 34 to the contact 36. Likewise, the right rear stop or signal light is connected by the wire 38 to the contact 40, and the left rear stop or signal light is connected by the wire 42 to the contact 44. Since the other side of each of these signal lights is grounded, if an electrical connection is made between any of these contacts and the output of the flasher, the signal light connected to that contact will flash intermittently. If, for example, the handle 28 is shifted in a counterclockwise direction, the segments 22, 24 and 26 will all be also shifted in a counterclockwise direction so that the contacts 36 and 20 are electrically connected through the segment 22 and the left front signal light is activated by impulses from the flasher; the segment 26 will be shifted to establish an electrical connection between the contact 18 and the contact 44 which will cause the left rear stop light to be intermittently activated by the output from the flasher. This arrangement means that, with the handle 28 in the downward position shown in Figure 2, the left rear signal or stop light will be flashing, together with the left front signal light.

As shown in Figure 1, the contacts 46 and 48 are connected together by the wire 49 and, in turn, the contact 48 is connected by the wire 50 to one side of the brake switch. The other side of the brake switch is connected by the wire 52 to the fuse 54 which is connected by the wire 56 to the wire 14 connected to one side of the battery. When the brake switch is closed, the contacts 46 and 48 are therefore connected directly to the battery. In the normal position of the handle of the direction signal switch, the contact 46 is connected by the segment 26 to the contact 40 so that under normal circumstances when the brake switch is closed, the right rear stop light will be energized and will burn steadily as long as that switch is closed. Likewise, the contact 48 is connected by the segment 24 to the contact 44 when the direction signal switch is in the normal position, which contact is connected by the wire 42 to the left rear stop light. This means that when the brake switch is closed, the left rear stop light will also normally be energized.

Looking again at Figure 2, it can be seen that the segment 24 has been shifted to perform the work formerly done by the segment 26 to connect contact 46 and contact 40 so that the right rear stop light will be energized by closing of the brake switch. The left rear stop, on the other hand, is no longer controlled by the brake switch when the direction signal switch is in the position shown in Figure 2, but is connected directly to the output of the flasher. This means, of course, that the right rear stop light, under these circumstances, is still operable as a stop light, while the left rear stop light will be energized as a turn signal indicator.

When the handle 28 of the direction signal switch is moved in the clockwise direction from the position shown in Figure 1, the right front signal light and the right rear stop or signal light are energized in substantially the same fashion as described for the signal lights on the left side of the vehicle.

In addition to the shifting of the segments 22, 24 and 26, just described, which is accomplished by the movement of the handle 28 of the direction signal switch, additional changes are accomplished in the circuit. The handle 28 may be provided with the anvils 58 and 60, which are adapted to be brought into abutment with the switch arms 62 and 64 when the handle 28 is in the left turn and the right turn signal positions, respectively. As shown in Figure 2, for example, when the handle 28 is in the left turn position, the anvil 60 is brought into abutment with the switch arm 64 and moves the arm from its normal position of abutment with the contact 66 into abutment with the contact 68. The contact 66 is connected by the wire 70 to one side of the light switch which is preferably mounted on the dashboard of the vehicle, the other side of the light switch being connected by the wire 72 to the battery. The contact 68, on the other hand, is connected by the wire 74 to the wire 42 which is, in turn, connected to the left rear stop or signal light. Similarly, the contact 76 is connected by the wire 78 to the wire 70 and therefore the right rear tail light is normally connected through the wire 80 and the switch arm 62 to the battery. In the same fashion, the left rear tail light is normally connected through the switch arm 64 to the battery. This connection of the two tail lights to the battery is, of course, made only if the light switch is closed.

Under the circumstances shown in Figure 1, therefore, the two tail lights are energized when the light switch is closed, both the switch arms 62 and 64 being in their normal position. When the switch handle 28 is moved, as shown in Figure 2, however, the switch arm 64 establishes contact between the left rear tail light through the wire 82 and the wire 74 with the wire 42, which is in turn connected to the output of the flasher. This means that both the left rear stop or signal light and the left rear tail light will be simultaneously energized by the intermittent pulses of electrical energy coming from the flasher whenever the handle 28 of the direction signal switch is disposed in the position shown in Figure 2. Meanwhile, the right rear tail light will still be energized in the conventional fashion and the right rear stop light will still be capable of being operated by the brake switch in the conventional fashion.

When the handle 28 of the direction signal switch is moved in a clockwise direction so that the anvil 58 is brought into association with the switch arm 62, a similar condition is brought about with respect to the right rear tail light and the right rear stop light. The rear stop light is then simultaneously energized with the tail light by the output of the flasher, since the switch arm 62 is brought into abutment with the contact 84, which is connected by the wire 86 to wire 38 connected between the right rear stop light and contact 40. With the handle 28 of the direction signal switch in this counterclockwise position, contact 40 will be connected by segment 24 to contact 20 so that the right rear stop or signal light will be connected to the flasher output. Likewise, with the switch arm 62 in the position just described, the right rear tail light will also be so connected to the flasher output.

The circuit described will therefore operate so that when a left turn is contemplated and the handle 28 of the direction signal switch is moved to the position shown in Figure 2, both the left rear stop light and the left rear tail light will respond simultaneously to the output of the flasher, while the right rear tail light and right rear stop light will continue to function normally. Conversely, when the handle 28 in the direction signal switch is moved to the position to indicate a right turn, the right rear tail light and the right rear stop light will flash simultaneously in response to the activation of the flasher, while the left rear stop light and the left rear tail light will continue to function normally.

Although the switch members 62 and 64 have been here shown as being operated by the anvils 58 and 60 on the handle 28 of the direction switch, it would be possible to provide additional contacts and movable segments or contact bars in the direction signal switch to accomplish the breaking of the normal circuits to the tail lights and the energization thereof with the associated signal light.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest to render expedient, without departing from the spirit or scope of this invention as further defined in the following claims.

It is claimed:

1. A manually operable switch assembly for electrical signaling systems for vehicles comprising a plurality of circularly disposed contact members, a pivotally mounted three position manually operable radial control arm, a contact bar carried by said arm adapted to electrically connect two different adjacent contacts of said plurality of circularly disposed contact members in each position of said radial arm, a pair of contact bars, each adapted to electrically connect two different alternate members of said contact members in each position of said radial arm, and a pair of normally closed single pole double throw switch members, one of said switch members being adapted to be moved to the alternative closed position by said radial arm in one of said three positions of said arm.

2. A manually operable switch assembly for electrical signalling systems for vehicles, comprising a plurality of spaced contact members; a pivotally mounted, three-positioned, manually operable control arm; a contact bar adapted to be positioned by said arm to electrically connect a different pair of said contacts in each position of said control arm; a pair of contact bars each adapted to electrically connect a different pair of said contact members in each position of said control arm; and a pair of normally closed, single pole, double throw switch members, one of said switch members being adapted to be moved to the alternative closed position by said control arm in one of said three positions of said arm.

3. A manually operable switch assembly for electrical signalling systems for vehicles, comprising a plurality of spaced contact members; a pivotally mounted, three-positioned, manually operable control arm; a contact bar adapted to be positioned by said arm to electrically connect a different pair of said contacts in each position of said control arm; a pair of contact bars each adapted to electrically connect a different pair of said contact members in each position of said control arm; and a second pair of contact bars adapted to be positioned by said control arm, each disposed to cooperate with a plurality of said contact members to form a normally closed, single pole, double throw switch, one of said switch members being adapted to be moved to the alternative closed position by said control arm in one of said three positions of said arm.

References Cited in the file of this patent

UNITED STATES PATENTS

| | | |
|---|---|---|
| 1,043,307 | Eidam | Nov. 5, 1912 |
| 1,204,675 | Lyon | Nov. 14, 1916 |
| 2,086,959 | Rom | July 13, 1937 |
| 2,125,668 | Chase | Aug. 2, 1938 |
| 2,172,068 | Murray | Sept. 5, 1939 |
| 2,321,803 | Falge et al. | June 15, 1943 |
| 2,330,648 | Warner | Sept. 28, 1943 |
| 2,361,204 | Hollins et al. | Oct. 24, 1944 |
| 2,562,274 | Hollins | July 31, 1951 |
| 2,598,657 | Hollins | May 27, 1952 |
| 2,617,902 | Lincoln et al. | Nov. 11, 1952 |
| 2,667,603 | Hollins | Jan. 26, 1954 |
| 2,706,808 | Hollins | Apr. 19, 1955 |